United States Patent Office 3,553,864
Patented Jan. 12, 1971

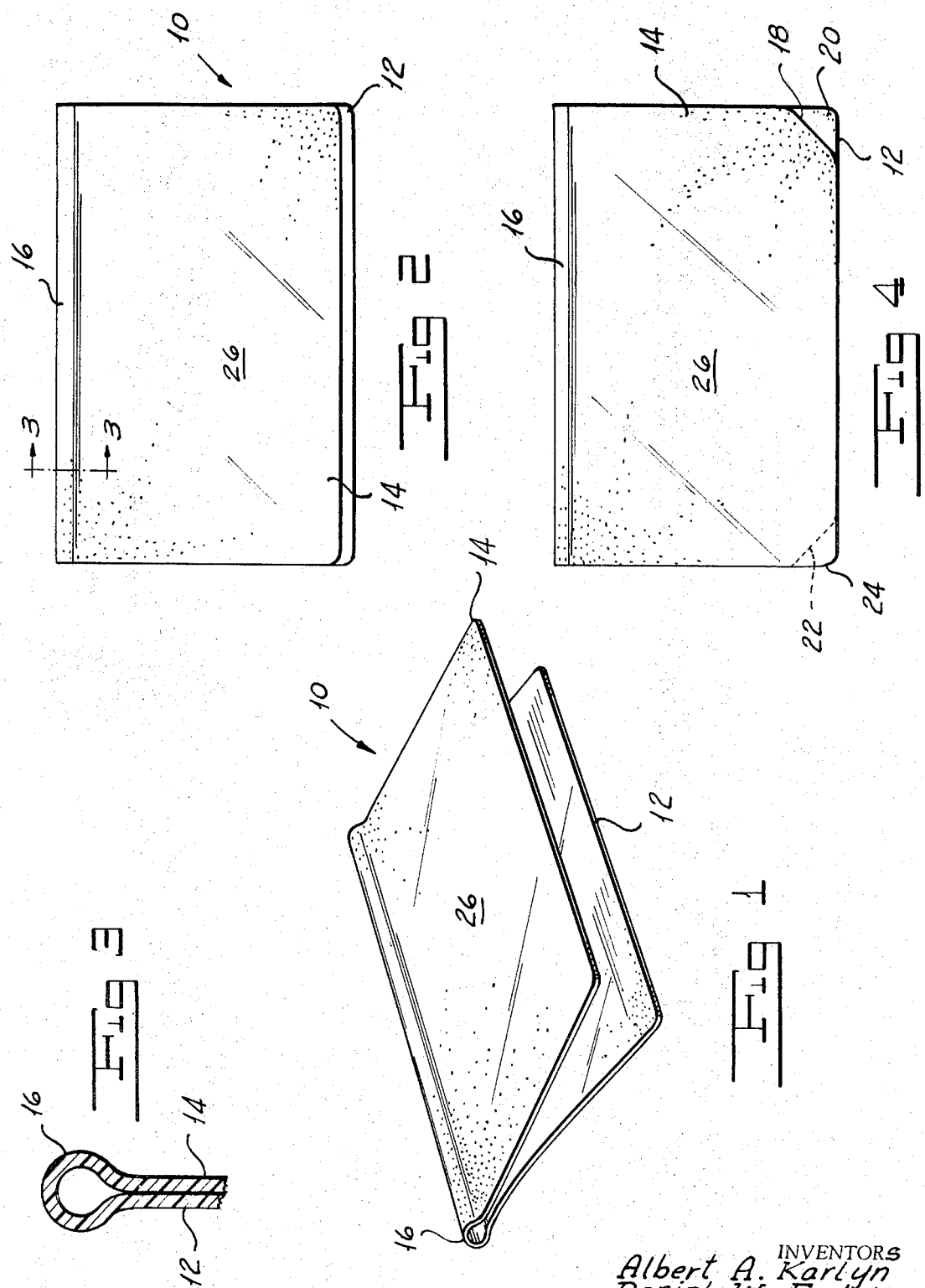

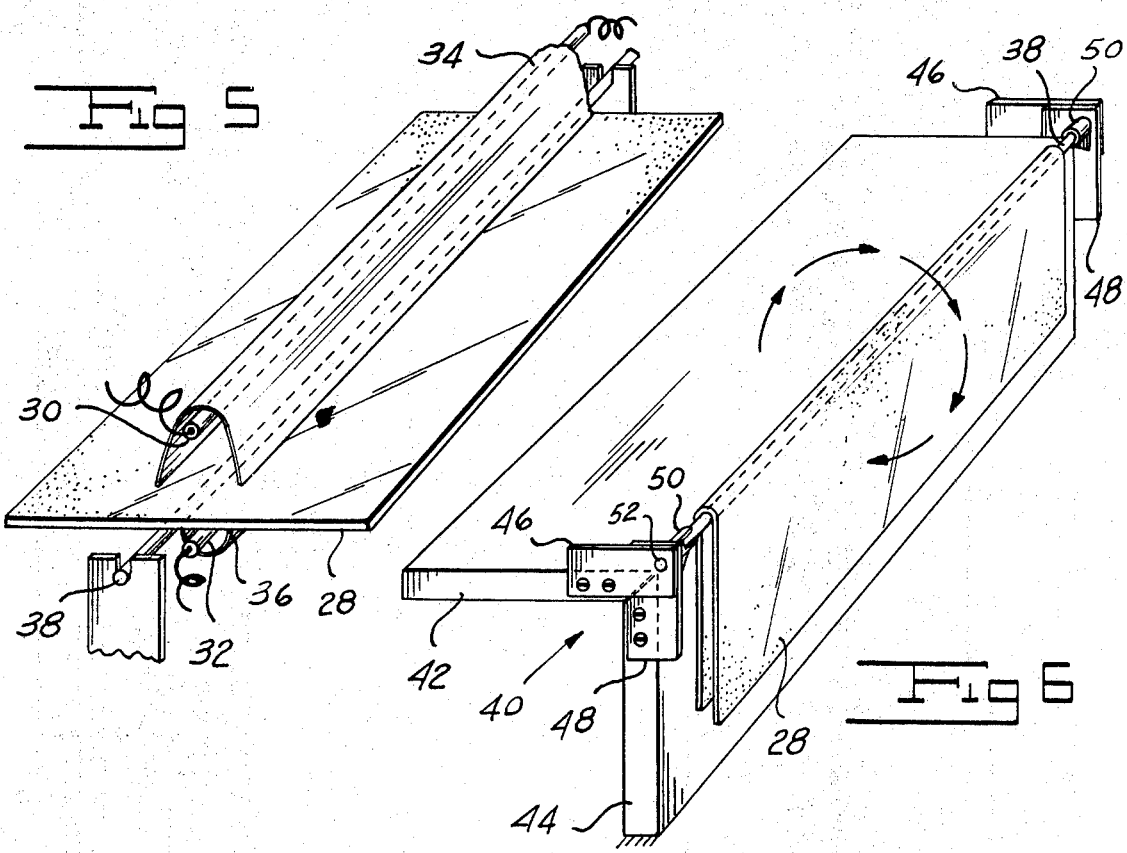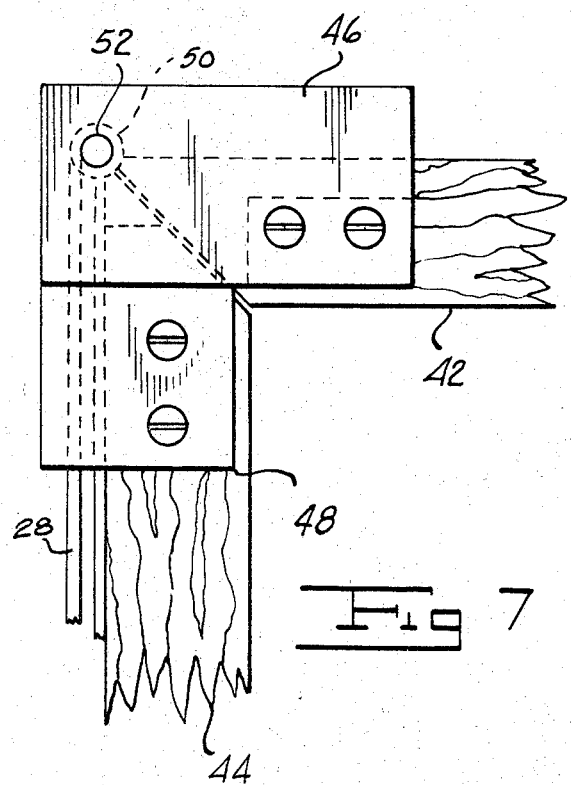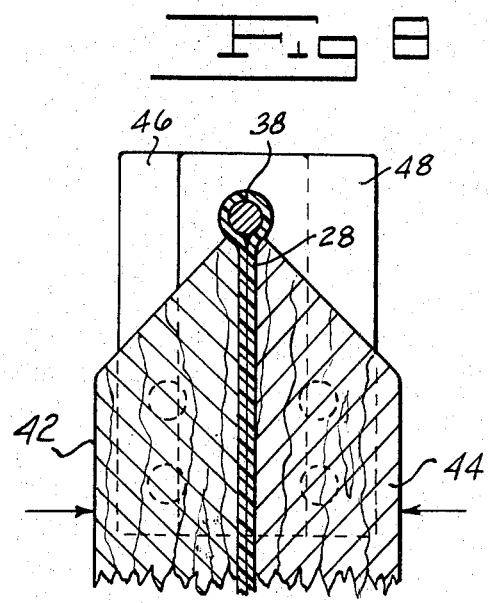

3,553,864
MAP HOLDER
Albert A. Karlyn, Wethersfield, Conn., and Daniel W. Fedak, Prompton, Pa., assignors to Gentex Corporation, New York, N.Y., a corporation of Delaware
Filed Jan. 22, 1968, Ser. No. 699,408
Int. Cl. G09f 3/18
U.S. Cl. 40—10                                    1 Claim

ABSTRACT OF THE DISCLOSURE

A holder for a map or the like which is an integral body of clear synthetic resin having a flat front and a flat back each of generally rectangular outline, and a connecting spring hinge of generally annular cross section extending along a side of each of the front and the back. The hinge normally biases the front to a position overlying the back so as releasably to clamp the map or the like between the back and the front. The outer surface of the front carries a coating which includes a flatting agent to reduce glare and to permit the surface to be written upon.

BACKGROUND OF THE INVENTION

Various devices have been employed in the prior art for holding maps and the like in positions in which they are folded open to expose to view a particular portion thereof and to hold a map in a position in which it can be read by a person such as a motorist or an aircraft pilot or the like. One of the most common of these devices is the well-known clipboard.

While devices of the prior art such as clipboards serve the purpose of holding a map open to expose a desired portion, they leave much to be desired. For example, the map or chart itself is not protected. The map cannot be written on without defacing it to an extent at which it becomes unusable after a period of time. The arrangements of the prior art further are relatively difficult to use and not as convenient as is desirable.

We have invented a map holder which overcomes the defects of devices of the prior art for holding maps and the like. Our map holder releasably holds the map with a desired portion exposed in such a way that it can readily and expeditiously be handled. Our map holder protects the surface of the map while making that surface readily visible. Our map holder permits writing to be correlated with the surface of the map while at the same time protecting that surface. Our map holder is extremely simple in construction and is expeditious to use. It is relatively inexpensive.

SUMMARY OF THE INVENTION

One object of our invention is to provide a map holder which retains a map in position with a desired portion exposed.

Another object of our invention is to provide a map holder which is simple in construction and expeditious to use and which may easily be handled.

A further object of our invention is to provide a map holder which protects that surface of the map which is exposed to view.

Still another object of our invention is to provide a map holder which permits writing to be correlated with the surface of the map while at the same time protecting the latter.

Other and further objects of our invention will appear from the following description.

In general our invention contemplates the provision of a map holder comprising an integral body of clear synthetic resin having a flat, generally rectangular front and a flat, generally rectangular back which are biased together in overlying relationship by an annular spring hinge extending along one side of each of the front and the back. We provide the holder with a dull outer surface which substantially eliminates glare and which permits writing to be applied to the surface and to be removed therefrom.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a perspective view of one form of our improved map holder.

FIG. 2 is a top plan view of the map holder shown in FIG. 1.

FIG. 3 is a sectional view of the form of our map holder shown in FIG. 2 taken along the line 3—3 of FIG. 2 and drawn on an enlarged scale.

FIG. 4 is a plan view of an alternate form of our improved map holder.

FIG. 5 is a schematic view illustrating one step in the formation of our improved map holder.

FIG. 6 is a schematic view illustrating a further step in the formation of our improved map holder.

FIG. 7 is a fragmentary view of a portion of the apparatus used in making our improved map holder.

FIG. 8 is a fragmentary sectional view of a portion of the apparatus used in making our map holder.

DESCRIPTION OF THE PREFERRED EMBODIMENT

Referring now to FIGS. 1 to 3 of the drawings, the form of our map holder, indicated generally by the reference character 10, shown therein is an integral body of clear synthetic resin to be described in detail hereinafter. The holder 10 includes a back 12 having a generally rectangular configuration and a front 14 which also is generally rectangular in outline. We form the body making up the map holder with a spring hinge 16 extending along one edge of each of the back 12 and front 14. Hinge 16 is generally annular is cross section and so biases the front and back toward each other that the front 14 normally overlies the back. The biasing force provided by the hinge 16 is such as will retain a folded map in position between the front and the back. When it is desired to remove the map from the holder, the front 14 and back 12 are separated against the biasing force of the hinge to permit the map to be removed. In order to facilitate this operation, we may, as shown in FIG. 2, have the back 12 extend beyond the lower edge of the front 14 along the edge remote from the hinge 16.

Alternatively to the arrangement illustrated in FIG. 2 for facilitating separation of the front and the back, we may, as shown in FIG. 4, cut away the lower righthand corner of the front 14 as indicated at 18 so as to expose a corner 20 of the back. We may similarly cut away the other corner of the back as indicated at 22 to expose a corner 24 of the front. These cuts and the exposed corners facilitate separation of the front from the back to permit removal and insertion of a map. We provide the outer surface of our map holder 10 with a dull surface finish 26 in a manner to be described hereinafter in order to eliminate glare and to permit writing to be applied to the surface and to be removed therefrom. This finish 26 is such, however, that it will not interfere with reading of the map. It permits even the finest print normally used on maps to be read with ease.

In making our map holder 10 we first select a sheet 28 of a suitable plastic. Materials which are suitable for formation of our map holder are cellulose acetate, acrylic resins and polycarbonate resins. Specifically, we may use acrylic resin sheets manufactured and sold under the registered trademark "Plexiglas" by Rohm & Haas Co. of Philadelphia, Pa. These acrylic sheets are thermoplastic and colorless and transmit all colors of the visible spectrum with 91% to 92% efficiency. We may use sheets of polycarbonate resin which are manufactured and sold under the registered trademark "Lexan" by General Electric Company of Schenectady, N.Y. Polycarbonate resins possess an unusual combination of toughness, impact strength, heat resistance and dimensional stability. We may also use combinations of cellulose acetate such, for example, as cellulose acetate butyrate.

The sheet we select to manufacture our map holder is clear plastic, though it may be provided with a tint if desired. We may use a sheet of any appropriate thickness so that the map holder will retain its shape in use while at the same time being sufficiently resilient to permit the front and the back to be sprung apart for insertion or removal of a map or the like. We have found a sheet having a thickness of 1/16" to be satisfactory.

While we may make our map holders individually, preferably we select a sheet 28 having a length such that a plurality of individual map holders may be cut therefrom following the forming operation to be described.

Preferably before forming the sheet, we apply a surface coating containing a flatting agent thereto to provide the surface finish 26. This may be done in various ways. For example, we may first form a flatting agent by reacting an acid with a silicate, precipitating hydrated silica, washing the precipitate, drying it and grinding it to a required size. When that has been done it may be mixed with a suitable carrier, such as a resin or the like, together with solvents in a concentration of the flatting agent of about 10 percent. This mixture can be applied to the surface of the sheet 28 by spraying or by any other appropriate method. After the coating has been sprayed thereon, the sheet can be placed in a hot press using a polished caul plate for the uncoated side and a sandblasted caul plate for the coated side. After pressing it is cooled and removed from between the plates. Preferably the surface of the sheet 28 to be coated is sandblasted or etched prior to spraying the coating to enhance adhesion of the coating to the surface.

Other commercially available coatings than the particular one described above may be employed. For example, one such coating is made up of a synthetic resin such as ethyl cellulose or cellulose acetate, a flatting jell and ketone and ester solvents. Another commercially available coating which can be used on sheets of any of the resins identified above includes 15 parts of pyrogenic silica, 85 parts of high molecular weight acrylic resin and 300 parts of ketones and aromatic hydrocarbons.

As will readily be understood by those of ordinary skill in the art, the transparency of the coating applied to the sheet 28 may be modified by changing the type of spray, the resin system and, particularly, the haziness thereof, the concentration of solids in the spray, the distance between the spray source and the surface and the solvent system. The hardness of the coating may be modified by varying any one of the resin system, the flatting agent used and the type of spray. It will be understood further that the preferred coating is governed to some extent by the basic material among those described above which is selected to make up the body of the case.

Still another flatting agent suitable for use in making our map holder may be selected from a series of silica aerogel products made and sold by Monsanto Company of St. Louis, Mo., under the registered trademark "Santocel."

After the surface finish 26 has been applied to the sheet 28, we next heat the sheet to permit formation of the hinge 16. This may be achieved by positioning the sheet between a pair of heater rods 30 and 32 having parabolic reflectors 34 and 36 associated therewith. If desired, the sheet may be supported on a hinge-forming rod 38 during the course of the heating step. We heat the central portion of the sheet 28 to a temperature which is sufficient to render it plastic. The forming temperature for a material such as cellulose acetate is about 245° F. For acrylic resins the temperature is about 340° F. Where we use a polycarbonate resin, we first dry the material for about five hours at 257° F. and then heat it to a temperature of from about 340° F. to about 400° F.

When the sheet has been heated to a temperature which is high enough to render it plastic, it folds over the rod 38 to the condition shown in FIG. 6. It will readily be appreciated that the location of the rod with relation to the sheet is determined by the location at which the hinge 16 is to be formed. When, for example, we are making the form of our map holder illustrated in FIG. 2, the rod is slightly to one side of the transverse centerline of the sheet.

After the heating operation and while the sheet 28 is still plastic, we place the rod carrying the sheet in a press indicated generally by the reference character 40. This press 40 has two sides 42 and 44 which are connected by pairs of hinge plates 46 and 48, one pair at each end of the press. We provide each of the hinge plates 46 with receptacles 50 for receiving the ends of the rod 38. The fittings or receptacles 50 are so located as to support the rod 38 with its axis aligned with the common axis of the hinge pins 52 of the two pairs of hinge plates.

After the rod 38 carrying the sheet 28 has been placed in the press 40 and while the sheet is still plastic, we swing the movable press side 42 from the position shown in FIGS. 6 and 7 to the position shown in FIG. 8 and exert pressure on the press sides as indicated by the arrows in FIG. 8 to bring the two portions of the sheet 28 together and to complete formation of the hinge. After cooling, the rod carrying the sheet is removed from the press. Next, the rod 38 is slid out of the hinge and a number of map holders 10 are formed merely by slitting the completely formed sheet. After slitting, the edges may be finished by sanding and, if desired, before sanding the corners may be clipped as illustrated in FIG. 4 to provide exposed corners for facilitating separation of the front and of the back.

In making our map holder we first select a sheet of a suitable plastic from among those mentioned hereinabove. The thickness of the sheet should be such as will provide a sheet which is semirigid but which is sufficiently flexible to permit the resultant map holder to be bent in the region of the hinge for removal and insertion of a map. Having selected a sheet, we next heat it in the region of its transverse centerline by subjecting it to the action of the radiant heaters 30 and 32, for example. In the course of this operation, the sheet may be supported on the rod 38 so that as it becomes plastic, it bends so as to hang down over the sheet.

After the sheet has been heated and while it is still plastic, it is placed in the press 40 together with the rod 38. The movable press side is then rotated on the hinge pins 52 and pressure is exerted on the sides of the press to complete the hinge. The rod and the completed map holder are then removed from the press. When the map holder is cooled, the rod is slid out of the hinge 16.

If we desire concomitantly to form a plurality of map holders, we use a sheet having a width which is some multiple of the desired end width of the map holder. After removal of the folded and hinged sheet from the press, the rod is removed and after cooling the sheet is slit to form a number of individual map holders. When that is done, the edges are smoothed off in a sandblasting or other similar operation.

When we are making the form of our map holder shown in FIG. 2, in the course of the heating operation and of bending the sheet around the rod 38, we place the rod 38 at a location slightly spaced from the transverse centerline of the sheet so that when the map holder is completed, the front and back thereof will have a slight overlap. Alternatively, to form the map holder shown in FIG. 4, no overlap is provided but upon completion of the hinge-forming operation and after the individual holders are slit from the sheet, one corner of each of the front and back is clipped, as indicated at 18 and 22, to expose other corners 20 and 24 of the back and the front.

The operation of providing the surface finish 26 preferably is accomplished on one surface of the sheet 28 before the heating and hinge-forming operations. Alternatively, if desired, we may apply the surface finish to the map holder after the hinge has been formed.

In use of our map holder when it is desired to expose a particular portion of a map to view, the map is folded to expose that portion and the front and back 14 and 12 are spread apart as indicated in FIG. 1 and the folded map is slipped in between. The operation of spreading the front and back is facilitated by the overlapping portion illustrated in FIG. 2 or by the exposed corners shown in FIG. 4.

When the map has been placed between the front and back, hinge 16 springs them back toward each other so as to clamp the map between the front and the back and releasably hold it therein. The surface finish 26 is such as permits even the finest print normally used on maps to be clearly seen when the front 14 is flat against the surface of the map. With the map in the holder it can readily be handled without disturbing its orientation and will not be soiled. In addition, the finish 26 permits writing to be applied to the outer surface of the front 14 by use of a pencil or a crayon or the like without defacing the map. For example, routes, stopover points and the like, can be indicated on the surface 26. Any writing which has been applied to the surface 26 can be removed by use of an eraser or, if required, by use of a suitable solvent. Any map which has been placed in the holder can be removed by again spreading the front and the back and another map can readily be inserted therein.

It will be seen that we have accomplished the objects of our invention. We have provided an improved map holder which retains a map in position with a desired portion thereof exposed. Our holder is simple in construction and expeditious to use in that it may easily be handled. Our map holder protects the surface of the map which is exposed to view. It permits writing to be applied over the exposed surface of the map without defacing the map itself.

It will be understood that certain features and subcombinations are of utility and may be employed without reference to other features and subcombinations. This is contemplated by and is within the scope of our claim. It is further obvious that various changes may be made in details within the scope of our claim without departing from the spirit of our invention. It is, therefore, to be understood that our invention is not to be limited to the specific details shown and described.

Having thus described our invention, what we claim is:

1. A holder for a map or the like comprising an integral sheet of transparent synthetic resin having a generally rectangular back, a generally rectangular front and a spring hinge of generally cylindrical configuration for biasing said front and back together over an interface releasably to clamp a map or the like between said front and said back, said hinge having an annular cross-sectional shape extending over substantially greater than 180°, said hinge being symmetrical about the plane of said interface, a portion of one of said front and back extending beyond the edge of the other of the front and back to facilitate separation of the two, and a coating comprising a flatting agent carried by the outer surface of one of said front and back.

References Cited

UNITED STATES PATENTS

| | | | |
|---|---|---|---|
| 2,409,814 | 10/1946 | Vargish | 40—11UX |
| 2,800,732 | 7/1957 | Duran | 40—23X |
| 3,283,421 | 11/1966 | Schott | 281—44X |

FOREIGN PATENTS

| | | | |
|---|---|---|---|
| 29,310 | 12/1896 | Great Britain | 40—11 |

JEROME SCHNALL, Primary Examiner

W. J. CONTRERAS, Assistant Examiner